United States Patent [19]

Madebrink et al.

[11] Patent Number: 5,434,798

[45] Date of Patent: Jul. 18, 1995

[54] RECONFIGURATION IN A CELLULAR COMMUNICATIONS NETWORK

[75] Inventors: Monica B. K. Madebrink, Stockholm; Walter Ghisler; Ake L. Ramstedt, both of Upplands Vasby; Anders C. E. Hoff, Hagersten; Sven G. Nordstrom, Molndal; Gunilla A. Bergling, Kungalv; Nils P. Taylor; Bo G. Svensson, both of Goteborg; Lars R. Waerme, Kungalv; Hans J. Roxbergh, Sollentuna; Jan E. A. S. Dahlin, Jarfalla; Harald Kallin, Sollentuna, all of Sweden

[73] Assignee: Telefonaktiebolaget L M Ericcson, Stockholm, Sweden

[21] Appl. No.: 704,397

[22] Filed: May 23, 1991

[51] Int. Cl.$^6$ .................... H04Q 7/00; G06F 15/20
[52] U.S. Cl. .................... 364/514; 455/33.1; 455/33.4
[58] Field of Search .......... 364/514; 455/8, 9, 15, 455/33.1, 33.4, 49.1, 53.1, 54.1, 56.1; 395/600; 379/94, 60, 59; 340/825.30, 825.5, 825.03, 826

[56] References Cited

U.S. PATENT DOCUMENTS

| | | | |
|---|---|---|---|
| 4,144,411 | 3/1979 | Frenkiel | 455/33.1 |
| 4,144,496 | 3/1979 | Cunningham et al. | 455/54.1 |
| 4,577,182 | 3/1986 | Millsap et al. | 455/33.1 |
| 4,669,107 | 6/1987 | Eriksson-Lennartsson | 455/33.1 |
| 4,670,899 | 6/1987 | Brody et al. | 455/33.1 |
| 4,718,081 | 1/1988 | Brenig | 455/33.1 |
| 4,723,266 | 2/1988 | Perry | 455/54.1 |
| 4,771,448 | 9/1988 | Koohgoli et al. | 455/33.1 |
| 4,817,190 | 3/1989 | Comroe et al. | 455/33.1 |
| 4,831,373 | 5/1989 | Hess | 455/17 |
| 4,901,340 | 2/1990 | Parker et al. | 379/60 |
| 5,025,254 | 6/1991 | Hess | 340/826 |
| 5,093,923 | 3/1992 | Leslie | 455/9 |
| 5,119,375 | 6/1992 | Paneth et al. | 455/33.1 |
| 5,195,090 | 3/1993 | Bolliger et al. | 455/33.2 |

FOREIGN PATENT DOCUMENTS 2236457 3/1991 United Kingdom .................. 379/59
91/14278 9/1991 WIPO .

OTHER PUBLICATIONS

McDonald; "Advanced Moblie Phone Service: The Cellular Concept"; Bell System Technical Journal vol. 58, No. 1 1979.
Young; "Advanced Mobile Phone Service: Introduction, Background, and Objectives"; Bell Tech. Journal (1979).
Chadha et al.; "Mobile Telephone Switching Office"-Bell Tech Journal vol. 58, No. 1 (1979)
Wacker et al.; "Cellular Radio"; Artech House (Norwood, Mass.) 1990.
CCITT Blue Book–Man–Machine Language (MML), vol. X, Fascicle X.7, 1989.
"CMS 88 Cellular Mobile Telephone System", Chapter 6, (1987).
CCITT Yellow Book, vol. 6, pp. 79–85 (1981).

*Primary Examiner*—Ellis B. Ramirez
*Attorney, Agent, or Firm*—Burns, Doane, Swecker & Mathis

[57] ABSTRACT

A method and apparatus for performing reconfiguration of a cellular network is provided. Cell parameters of affected mobile switching centers in the network are copied to a database, and the copied parameters are stored. A set of proposed changes to the stored parameters are prepared and the consistency of the prepared set of proposed changes is verified. Any necessary alterations to the set of proposed changes responsive to the verification are made and the verified set of proposed changes are copied to the affected mobile switching centers. The verified set of proposed changes are then introduced into the network. Additionally, at all times, an up-to-date image of all the cell parameters in all the mobile switching centers in the network is maintained in a system parameter database.

25 Claims, 8 Drawing Sheets

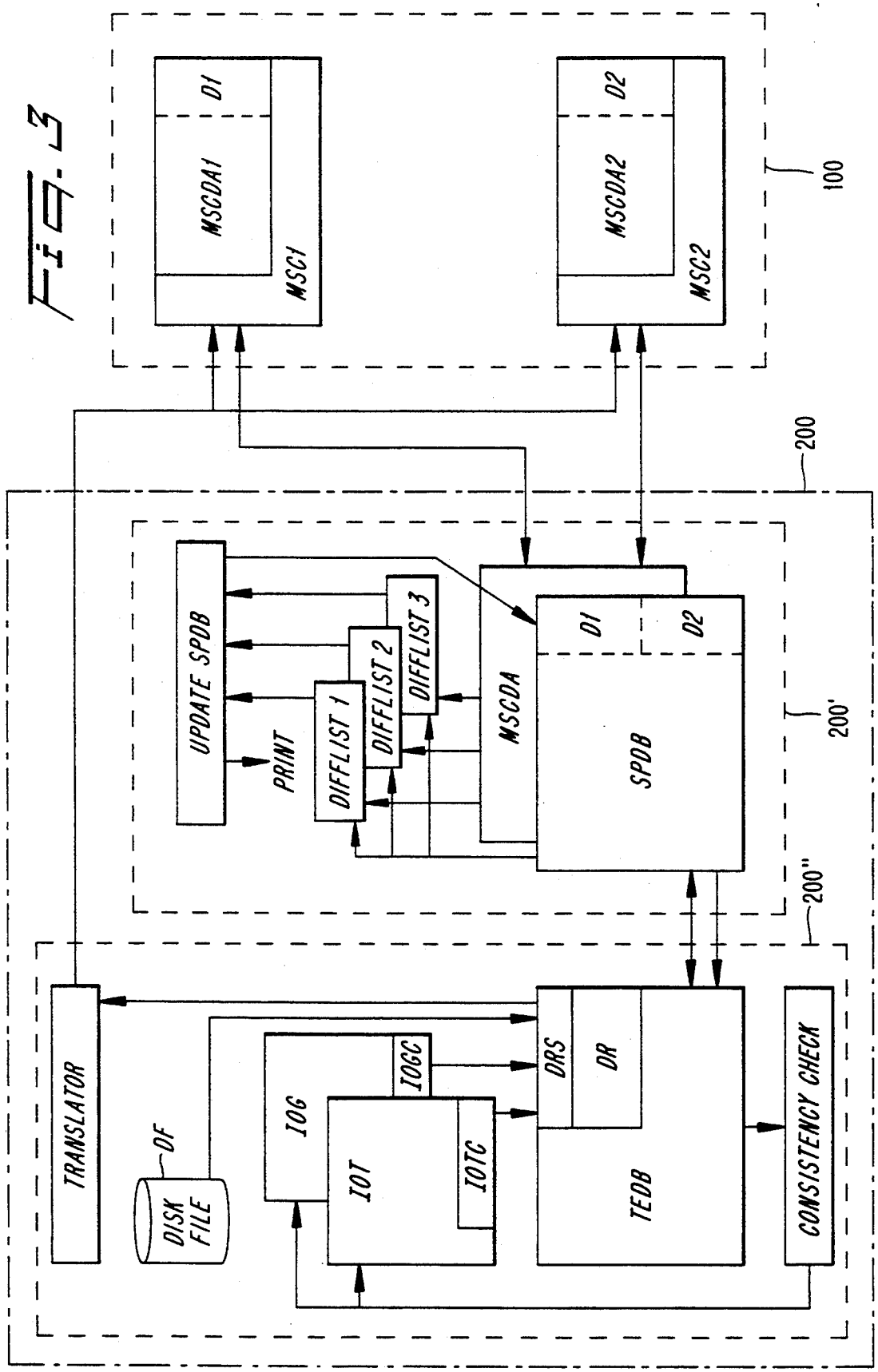

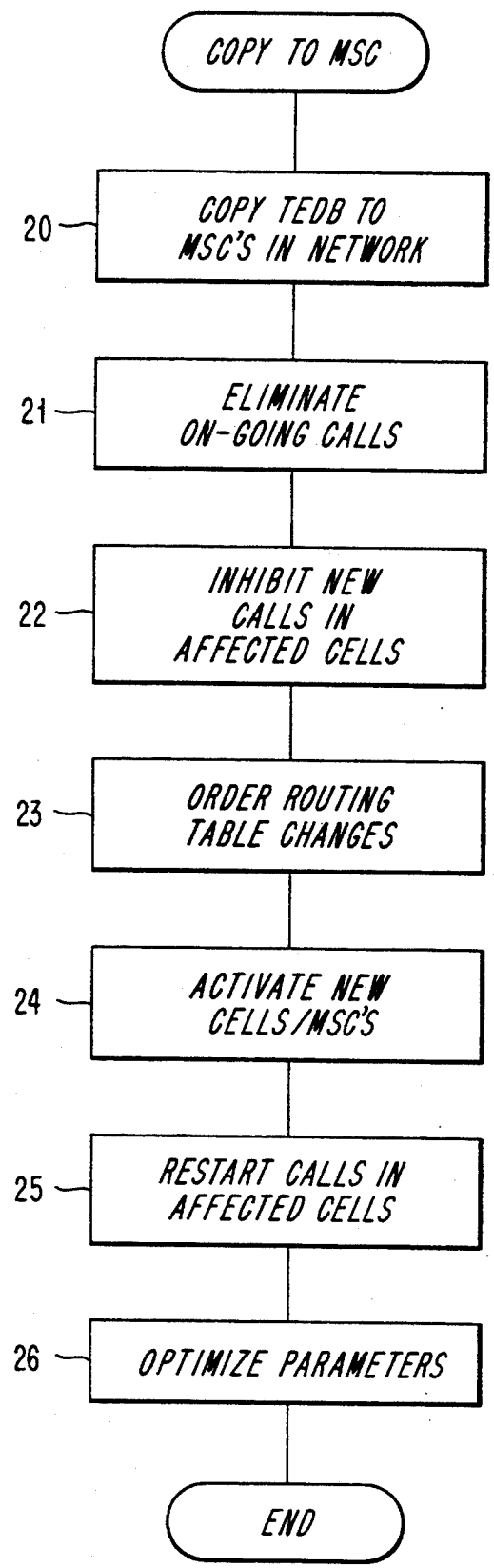

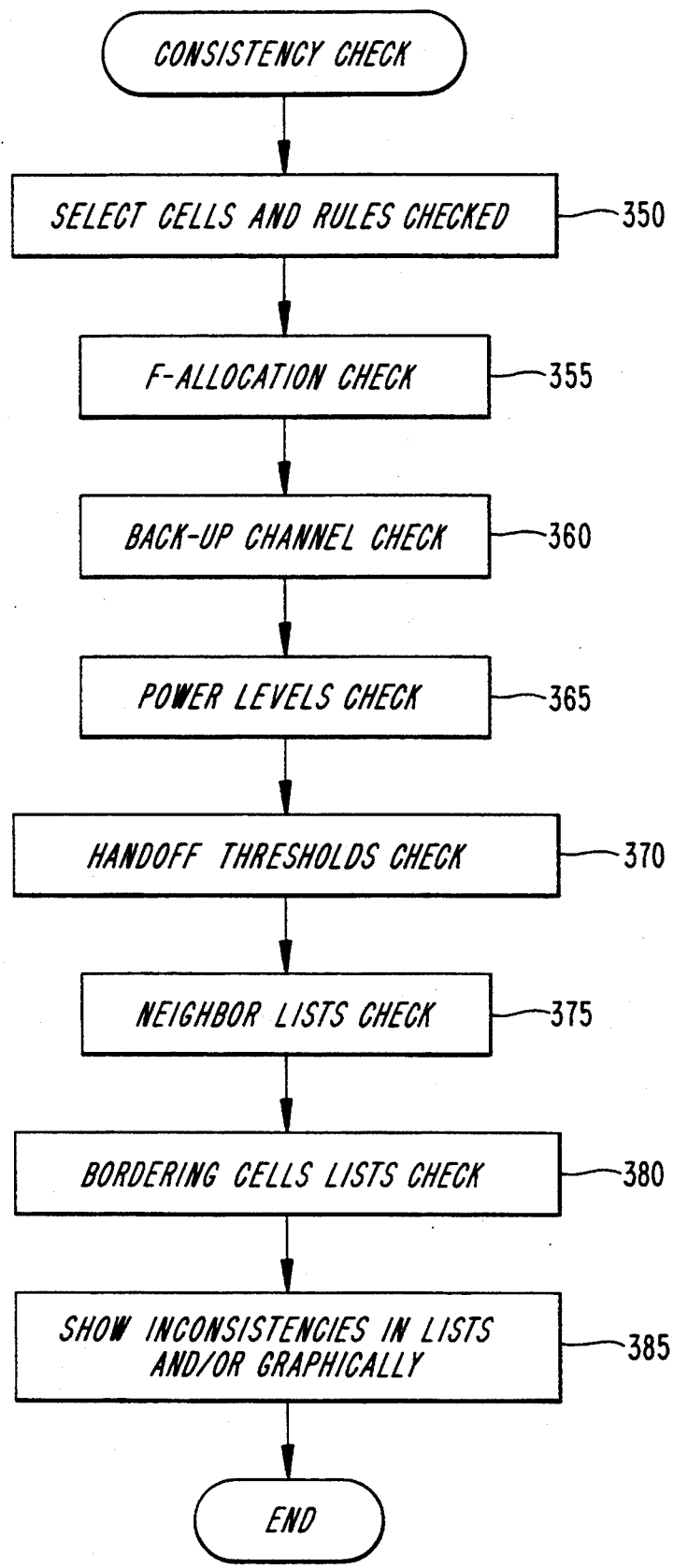

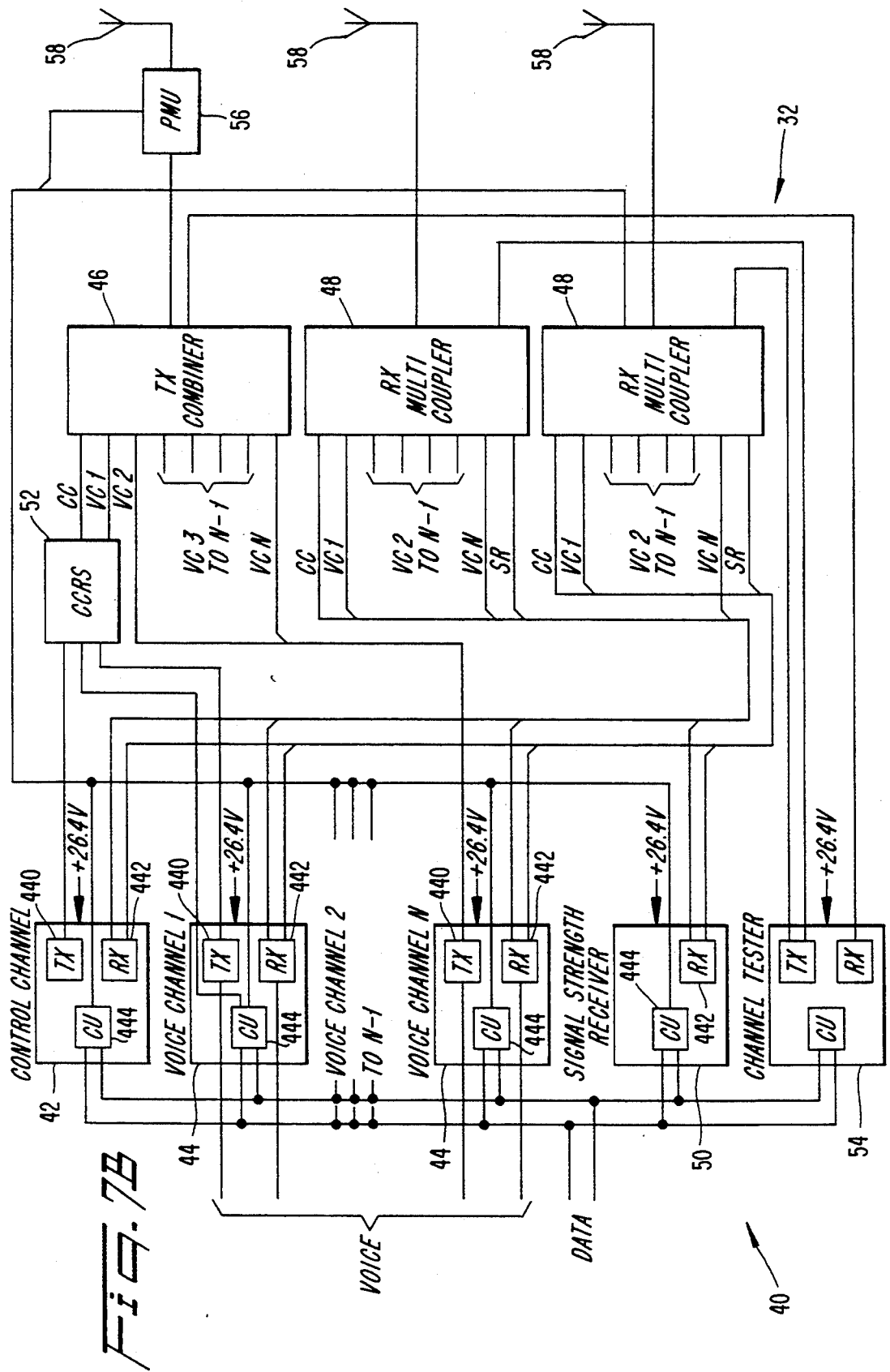

RECONFIGURATION IN A CELLULAR COMMUNICATIONS NETWORK

FIELD OF THE INVENTION

The present invention relates to the management of cellular mobile radio systems. More particularly, the present invention is directed to a method and apparatus for reconfiguration of a cellular network when such reconfiguration becomes necessary due to permanent or temporary growth, decrease of traffic, equipment malfunctions or engineering changes.

BACKGROUND OF THE INVENTION

A typical cellular mobile radio telephone system is controlled by at least one mobile switching center (also known as a mobile telephone switching office), at least one base station, and at least one mobile station. The mobile switching center constitutes an interface between the radio system and the public switching telephone network. The base station transmits information between the mobile stations and the mobile switching center. Calls to and from mobile subscribers are switched by the mobile switching center. The mobile switching center also provides the signalling functions needed to establish the calls.

In order to obtain radio coverage of a geographical area, a number of base stations are normally required. This number may range from, in the exceptional case, one base station, and up to one hundred or more base stations in normal systems. The area is divided into cells, where each cell may either be serviced by a base station or may share a base station with a number of the other cells.

The fast development of cellular telephony has caused the administration of cellular networks and their reconfiguration to become more difficult. Problems with the administration of the networks arise when, for example, the growth of the number of mobile subscribers requires existing cells to be split into several smaller cells or a base station or a mobile switching center becomes temporarily inoperative requiring traffic through that base station or mobile switching center to be temporarily reassigned.

Wire bound telephone networks have had administrative systems for some time. But mobile cellular networks have many parameters and many requirements which are not encountered in the wire bound networks and which are not satisfied by existing administrative systems. For example, the location of the mobile subscribers must be known to the land system in order to direct calls properly. Additionally, each cell has certain associated parameters or characteristics which must be properly maintained to ensure proper operation of the cellular network.

Conventionally, manual or semi-manual ad hoc methods have been used to introduce parameter changes in the cellular networks for reconfiguration purposes and to check the accuracy of the proposed parameter changes. One such manual method used in conventional systems is performed in the following manner. The method will be described with reference to FIGS. 1 and 2 and Table I and using, as an example, a proposed cell split caused by an increase in the number of mobile subscribers. A cell split is described in "CMS 88 Cellular Mobile Telephone System", Ericsson publication EN/LZT 101 908 R2B, Chapter 6 (1987).

FIG. 1 illustrates a simple cell split, which, in this example, consists only of the introduction of one new cell. As shown in FIG. 1, there are five existing cells 1, ..., 5 (shown in solid lines) and one new cell 6 (shown in dashed lines). Each cell includes a base station BS1, ..., BS6. There are two mobile switching centers MSC1, MSC2, and cells 1, 5 and 4 are allocated to MSC1, whereas cells 2, 3 and 6 are allocated to MSC2. The cells are connected to their respective mobile switching centers via a PCM link. There is also an administrative center ADM connected to the mobile switching centers MSC1, MSC2 via an X25 link.

FIG. 2 illustrates an example of a manual check which is done in conventional systems when a cell split is being planned and implemented. When the operator at, for example, MSC2 wants to introduce cell 6 in the network, he collects the network parameters involved from MSC2 and MSC1, and prepares the new data required in MSC1 and MSC2, for example, the new neighbor cell definition of FIG. 2. Then he performs a manual check of the proposed changes to determine if any errors have been made. One such check involves determining whether the matrix of FIG. 2 has an equal number of cells in each row and in the corresponding column to ensure that all neighboring cells have been identified properly. This is important since the changes required to introduce a new cell into the network may not only affect the concerned switch, including associated radio base stations and cells, but also the surrounding switches, radio base stations and cells.

If the number of cells in one row is different than the number of cells in the corresponding column, this indicates that there is at least one cell defined as a neighbor for another cell but not visa versa. Other manual and computer assisted checks are also performed before the new data is approved. These manual and semi-manual checks become unduly burdensome and unmanageable as the network grows in size.

Table I illustrates an example of some of the information, i.e., the orders, to be entered into MSC2 to introduce cell 6 in MSC2. A corresponding set of orders is prepared for MSC1. The details of the illustrated commands may be found in the man machine language MML standards (CCITT Yellow Book, Vol. VI, VII Plenary Assembly, Geneva 1981).

In conventional systems, the commands shown in Table I are entered manually by the operator responsible for the mobile switching center concerned. If more than one mobile switching center is involved, the operators agree by telephone what data to enter and when. When installing and starting a complete new network the orders may be provided on a magnetic tape per mobile switching center and entered into the network via tape readers. The manual procedures done conventionally are prone to human error and are very slow. This is of particular concern when reconfiguration is required quickly, with no advance planning possible, due to malfunctions in the network, for example, a failed base station or mobile switching center.

In a cellular network, a large number of parameters and relationships are stored in the mobile switching centers. For operators of these networks, it is difficult to maintain an overview of these parameters and to keep them consistent and correct. It is particularly difficult to maintain consistency when manually implementing a reconfiguration. This difficulty is compounded when several mobile switching centers are operating in the network.

In conventional systems, to survey the cellular network, a copy of all system parameters are maintained in a database, which can be termed the system parameter database. It is important that the system parameter database always contain the current picture of the cellular network. In a rapidly growing network, the system parameter database must therefore be updated frequently and efficiently. This is difficult to accomplish in conventional systems.

SUMMARY OF THE INVENTION

The CCITT man machine language MML or an equivalent language has conventionally been used to perform several activities interactively in the network. These activities include:

1. cell splitting and cell combining due to changes in traffic;
2. cell reassignment to mobile switching centers due to changes in the number of mobile switching centers;
3. temporary or permanent cell reassignments due to malfunctioning units, for example, base stations or mobile switching centers; and
4. cell parameter changes due to engineering changes, for example, changes in the frequency plan.

The present invention is based on the observation that the network activities described above contain a common procedure which may be called "reconfiguration". It consists mainly of the following steps:

1. the cell parameters of the affected part of the network, as they appear before a reconfiguration is implemented, are copied via data link from the associated mobile switching centers to a database in an administrative center in the network;
2. the changes to the cell parameters of the cell or cells affected by the proposed reconfiguration are prepared by the network planners and/or by an automatic program and entered into the database;
3. a program verifies the consistency of the suggested parameter changes and any necessary corrections are made manually or automatically;
4. the new cell parameters are copied via data link from the database to the mobile switching centers concerned; and
5. the reconfiguration and associated parameter changes are introduced in the network, for example, by deblocking the affected cells.

One advantage of the present invention is that the changes may be simultaneously downloaded into several mobile switching centers from one common point in the network, that is the administrative center, thereby creating a complete procedure which may be activated with or without human intervention. In other words, the procedure may be activated by the operator or automatically when, for example, a base station malfunction alarm triggers an automatic reconfiguration based on prestored change specifications.

The present invention introduces a centralized processor controlled procedure with a number of advantages, including, but not limited to:

1. reconfiguration is carried out more reliably using a unified procedure which is not dependent upon the reason for the reconfiguration; and
2. reconfiguration is carried out faster, or in some case automatically.

In order to overcome the disadvantages noted with conventional systems, the present invention according to a preferred embodiment is directed to a method of performing reconfiguration of a cellular network including copying cell parameters of affected mobile switching centers in the network to a database, and storing the copied parameters, preparing a set of proposed changes to the stored parameters, verifying the consistency of the prepared set of proposed changes and making any necessary alterations of the set of proposed changes responsive to the verification, copying the verified set of proposed changes to the affected mobile switching centers, and introducing the verified set of proposed changes into the network. The reconfiguration may be temporary and the network may be restored to an original state using the stored cell parameters. The updating function of the image of the network may be initiated periodically by the operator and the set of proposed changes may be manually entered. Alternatively, the reconfiguration may be automatically initiated upon an occurrence of an event and the set of proposed changes may be stored in a memory.

According to a preferred embodiment, a method is provided of modifying at least a part of a cellular network, including copying, via a datalink from associated ones of the switches to the administrative database, cell parameters of at least one cell as the parameters are stored before a proposed modification is implemented, determining at least one change to the cell parameters of the at least one cell affected by the proposed modification, and entering the at least one change into the administrative database. The consistency of the entered change is then verified and any necessary corrections are made to the at least one change responsive to the verification. The verified/corrected cell parameters are then copied, via the data link from the administrative center to the associated ones of the switches, and the verified/corrected cell parameters in the associated ones of the switches are activated to introduce the modification into the network. The method may further include, prior to the activation, eliminating ongoing calls of the at least one mobile station assigned to the associated cells by handing off ongoing calls to neighboring cells, and inhibiting new calls in the affected cells by using directed retry, and after the step of activating, the step of restarting calls in the affected cells. A set of parameter changes may be stored for each base station and each mobile switching center in the network, and when a particular base station or mobile switching center malfunctions, the modification of the at least part of the cellular network may be automatically initiated by using the stored set of parameter changes associated with the particular base station or mobile switching center in the step of determining. Before the activation, routing table changes may be ordered in any mobile switching centers affected by the modification. Live traffic in the network may be measured after the activation, and the cell parameters may be optimized using successive changes responsive to the live traffic measurements.

According to a preferred embodiment, a method of maintaining a system parameter database in a cellular network is provided including obtaining current parameter data from at least one mobile switching center in the network, storing the obtained current parameter data in a data buffer, generating a difference list by comparing the stored current parameters with existing data in the system parameter database by storing in the difference list data which is in the stored current parameter data but not in the existing data, data which is in the existing data but not in the stored current parameter data, and data which has different values in the stored current parameter data as compared with the existing data, and updating the system parameter database from the difference list. The step of updating includes deleting data from the system parameter database which is in the existing data but not the stored current parameter data, adding data into the system parameter database which is in the stored current parameter data but not in the existing data, and updating data in the system parameter database for which different values were found.

According to a preferred embodiment, an apparatus is provided for providing service in a cellular mobile radio system in response to a communication need, including a base station located near an area in need of communication services, and means connected to the system for implementing a plurality of system changes required to connect the base station to the system. The means for implementing comprises means for verifying the consistency of the plurality of changes.

According to a preferred embodiment, an apparatus is provided for performing reconfiguration of a cellular network, including at least one mobile switching center database for storing a plurality of cell parameters, a system parameter database connected to the at least one mobile switching center database for storing an up-to-date image of cell parameters in the network, buffer memory means connected to the at least one mobile switching center database and the system parameter database for storing at least one cell parameter change to be used to update the system parameter database, and a temporary database connected to the system parameter database and the buffer memory means for temporarily storing proposed cell parameter changes to be introduced into the network. The apparatus further includes means for updating the system parameter database from the at least one cell parameter stored in the buffer memory means, said means being connected to the system parameter database and buffer memory means, and being responsive to an update command. The means for updating includes means for creating a difference list by comparing the at least one cell parameter in the buffer means with the cell parameters stored in the system parameter database, and storing in the difference list any cell parameter which is in the system parameter database and not in the buffer means, any cell parameter which is in the buffer memory means and not in the system parameter database, and any cell parameter for which the value in the buffer memory means is different than the value in the system parameter database.

According to a preferred embodiment, a method is provided of maintaining a cellular network, including copying data from at least one switch affected by the maintenance into a buffer memory, and updating data in a system parameter database from the data in the buffer memory, whereby an up-to-date image of the network is maintained in the system parameter database. The step of updating includes generating a difference list by comparing the data in the system parameter database with the data in the buffer memory and storing in the difference list data, which is in the system parameter database and not in the buffer memory, data which is in buffer memory and not in the system parameter database, and data which has different values in the system parameter database as compared with the buffer memory, and updating the system parameter database from the different list. The step of updating from the difference list includes deleting data from the system parameter database which is in the system parameter database and not in the buffer memory, adding data to the system parameter database which is in the buffer memory and not in the system parameter database, and updating data in the system parameter database for which different values are found. The method further includes copying the data in the system parameter database into a temporary database, making changes to the data stored in the temporary database, performing at least one consistency verification procedure on the changed data stored in the temporary database, and transferring the verified data to the at least one switch affected by the maintenance. The step of performing includes for any data that fails the at least one consistency verification procedure, making any necessary correction to the data, and the step of transferring includes when the data passes the at least one consistency verification procedure, translating the data to appropriate commands and sending the commands to the affected at least one switch. The method further includes measuring live traffic in the network after the step of transferring and optimizing cell parameters in the at least one switch responsive to the live traffic measurements.

According to a preferred embodiment, a computer program product is provided having a computer readable medium having computer program logic recorded thereon for implementing reconfiguration of a cellular network. The computer program product includes means for receiving and storing existing cell parameters, means for storing a set of proposed changes to the stored parameters, means for verifying the consistency of the stored set of proposed changes, and means for outputting the verified set of proposed changes.

According to a preferred embodiment, a computer program product is provided having a computer readable medium having computer logic recorded thereon for implementing maintenance of a cellular network. The computer program product includes means for copying cell data from at least one cell in the network into a buffer memory, and means for updating cell data in a system parameter database from the cell data in the buffer memory, whereby an up-to-date image of the network is maintained in the system parameter database.

The means for updating includes means for generating a difference list by comparing the current data in the system parameter database with the data in the buffer memory and storing in the difference list data which is in the system parameter database and not in the buffer memory, data which is in buffer memory and not in the system parameter database, and data which has different values in the system parameter database as compared with the buffer memory, and means for updating the system parameter database from the difference list.

Still other objects, features and attendant advantages of the present invention will become apparent to those skilled in the art from a reading of the following detailed description of the embodiments constructed in accordance therewith, taken in conjunction with the accompanying drawings.

BRIEF DESCRIPTION OF THE DRAWINGS

The present invention will now be described in more detail with reference to the preferred embodiments of the device, given only by way of example, and with reference to the accompanying drawings, in which:

FIG. 3 is a schematic block diagram illustrating an apparatus for implementing reconfiguration of a cellular network according to the present invention;

FIG. 4A and 4B are flowcharts illustrating a method of reconfiguring a cellular network according to the present invention;

FIG. 6 is a flowchart illustrating a consistency check routine according to the present invention;

FIGS. 7A and 7B are block diagrams illustrating a base station in a cellular mobile radio system.

DETAILED DESCRIPTION OF THE PREFERRED EMBODIMENTS

FIG. 3 illustrates, in schematic block diagram form, a portion of a cellular network according to the present invention. Three main databases are used to store the network parameter data according to a preferred embodiment of the present invention: the system parameter database SPDB, the buffer MSCDA, and the temporary database TEDB. According to a preferred embodiment of the present invention, these databases interact as follows.

An updated image of the network is maintained in the SPDB. When changes occur in the network, SPDB is incorrect until it has been updated.

It is also necessary to identify the actual changes in the network when they occur. For this purpose, a snapshot buffer memory MSCDA is used enabling the registration of changes, before they are used to update the network image in SPDB. The changes are either induced changes, when the administrative center orders them, or they are spontaneous, as for example, in the case of malfunctions and alarms.

Figure 1:
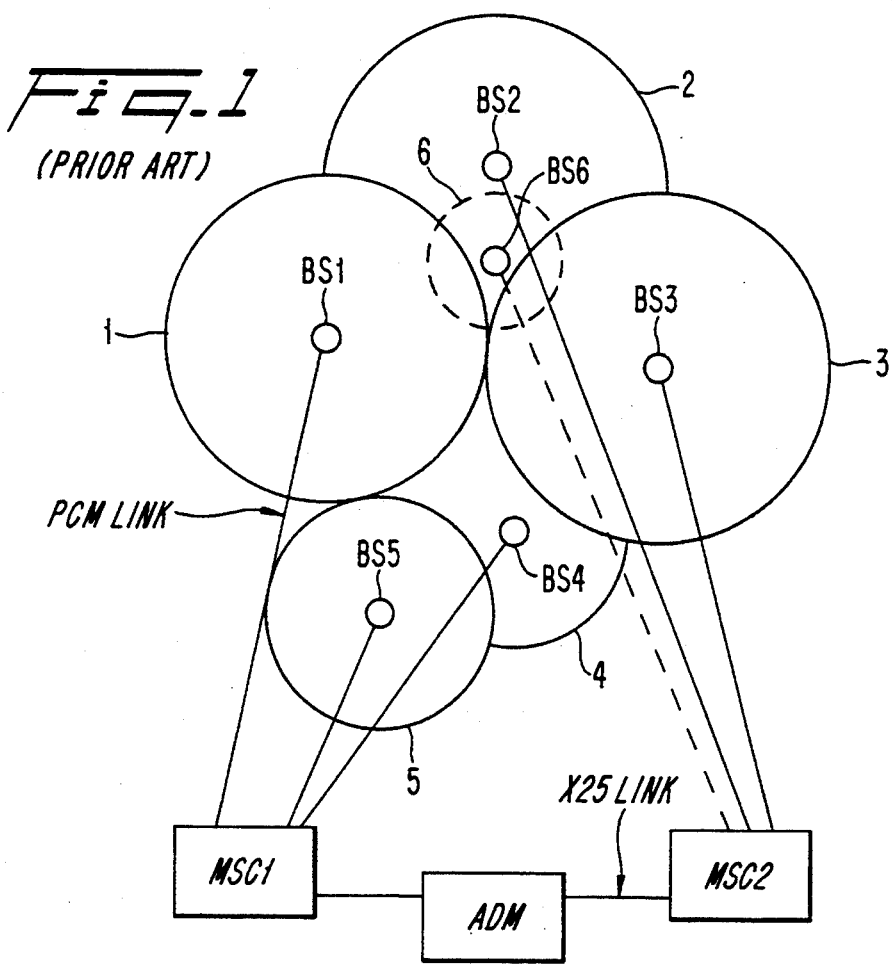
FIG. 1 is a schematic diagram illustrating a simple reconfiguration to be implemented in a cellular network.

The SPDB is a large file, whereas MSCDA often registers a very limited number of changed parameters, for example, considering the planned change of FIG. 1. It is useful to know not only the new version of SPDB, but also where in the large SPDB the changes have been made. This is seen in MSCDA. However, in other cases, such as periodic checks of the network parameters, all parameters have to be collected in the MSCDA. In this case, the size of MSCDA is equal to the size of SPDB.

The TEDB is a working area in which suggested parameter changes can be introduced while leaving the up-to-date image of the network undisturbed in SPDB, since it may be necessary to refer back to the unchanged image. Once the consistency of the proposed changes has been verified, the changes are introduced into the network from the TEDB through the translation program.

According to a preferred embodiment as shown in FIG. 3, the cellular network 100 includes two mobile switching centers MSC1 and MSC2. Of course, depending upon network requirements, any number of mobile switching centers may be connected together. For the sake of simplicity, the associated base stations are not shown in FIG. 3. In the mobile switching center MSC1, there is a database MSCDA1 which stores the parameters describing the cells associated with the mobile switching center MSC1. D1 is the data of one cell group, where the database MSCDA1 stores data from a number of cell groups and a cell group contains at least one cell.

A cell group is defined as follows. When introducing a change in a given cell, the cells affected by the change consist of the cell to be changed and all neighboring cells, where the neighboring cells are those cells to which handoff may be made from the given cell. A cell group is the subset of the cells affected by the change which are connected to the same mobile switching center, if there are more than one mobile switching centers associated with the cells involved in the change.

According to a preferred embodiment, the mobile switching center MSC1 is implemented as an Ericsson AXE switch. Of course, the present invention can be implemented using other types of switches. The mobile switching center MSC2 may be described similarly to the mobile switching center MSC1.

An administrative center 200 is connected to the mobile switching centers in the network 100 to administrate the network and, in particular, according to a preferred embodiment of the present invention to perform reconfigurations. According to a preferred embodiment, the administrative center is implemented as a SUN ® computer model SPARC, although any computer may be used. The methods and apparatus of the present invention, according to a preferred embodiment, are implemented as a computer program which runs on this computer. The administrative center can be collocated with one of the mobile switching centers in the network or it can be separately located with respect to all mobile switching centers.

A first subsystem of the SUN ® system contains the means to create and maintain an up-to-date image of the cellular network. This subsystem is outlined by a dashed line labeled 200' in FIG. 3.

The subsystem 200' consists of the following parts. The system parameter database SPDB contains a complete image of the network parameters, including the data from all mobile switching centers in the network. Examples of some of the parameters stored in the SPDB are shown in Table II.

In a preferred embodiment, in the SPDB of FIG. 3, D1 is the cell group data from the mobile switching center MSC1 and D2 is the cell group data from the mobile switching center MSC2. For example, considering the example shown in FIG. 1, when a change is introduced into the network, only the data in the network associated with the planned change needs to be collected. For the example of FIG. 1, the data of cells 1-5 must be collected, since they are neighbor cells to the planned new cell 6. Cells 1, 4 and 5 are referred to as one cell group and cells 2 and 3 as a different cell group, because their data has to be collected from different mobile switching centers. Each time the SPDB is to be updated, the buffer MSCDA receives the current parameter data collected from the mobile switching centers MSC1 and MSC2 before it is used to update the system parameter database SPDB.

The difference lists DIFFLIST1, DIFFLIST2, DIFFLIST3 are preferably software routines which extract and store in a memory the differences between the buffer MSCDA and the system parameter database SPDB. In a preferred embodiment, DIFFLIST1 stores objects found in both the buffer MSCDA and the system parameter database SPDB but with differing parameter values, DIFFLIST2 stores objects which are in the buffer MSCDA but not in the system parameter database SPDB, and DIFFLIST3 stores objects not in the buffer MSCDA but in the system parameter database SPDB. For purpose of this discussion, objects are, for example, base stations and cells. Each object has associated therewith at least one parameter. An object is represented in the database as an identity with parameters. The function unit UPDATE SPDB performs the updating in three steps according to the subdivision described with reference to the difference lists. This will be described more fully in the following discussion.

The updating function may be initiated periodically or may be event-controlled by the SUN ® computer which sends an appropriate audit order to the mobile switching centers it supervises. A system which allows both event-controlled and periodic updating is preferable, since it is a function of the system parameter database to have an updated image of the cellular network at all times as well as to allow operator initiated updating when desired.

A second subsystem of the SUN ® system contains features for reconfiguring the cellular network, that is, introducing or eliminating cells or whole mobile switching centers in the cellular network, or merely changing parameters of existing cells or mobile switching centers. This subsystem is outlined by a dashed line labeled 200″ in FIG. 3.

According to a preferred embodiment of the invention, a temporary rise in the number of subscribers in a given location, for example, a large concert or sporting event, may cause severe cellular traffic problems. To handle the additional traffic created by such an event, a permanent base station may be installed in a location where such additional traffic may be generated. This base station may then be temporarily added to the network as necessary. Alternatively, a temporary mobile base station, mounted in a vehicle or movable container may be moved into the area. During, or just prior to the event which is anticipated to cause additional cellular traffic, a cell split may be performed to add the temporary base station to the network using the techniques of reconfiguration described herein. When the event is over, a cell recombination may be performed, removing the temporary base station from the network, using the techniques of reconfiguration described herein. The reconfiguration may be done using cell split data that is stored and can be reused when there is an event in that location. Alternatively, the cell split data may be entered by an operator as described below.

The subsystem 200″ consists of the following parts. The temporary database TEDB is a copy of the system parameter database SPDB in which changes to the cellular network may be introduced and checked before they are implemented in the real cellular network. After the procedures for verifying the accuracy and appropriateness of the proposed changes stored in TEDB are completed, the network has been updated from TEDB and SPDB has been updated from the network, the temporary database TEDB may be compared to the system parameter database SPDB to be sure the intended change or changes have been implemented.

The area DR, which takes part in the evaluation of a suggested change, may be defined such as to include all cells and mobile switching centers which might be affected by the proposed changes. The part of DR labeled DRS indicates where in the network actual parameter changes have been suggested so that checking of any uninvolved parts of the network can be avoided. According to a preferred embodiment, the consistency check program must operate on all parameters occurring in the checks, not only on parameters that have been changed. For example, the parameters of a neighboring cell may not have been changed, but these parameters are required to complete the operation of the consistency check. The area DRS stores the parameters which have been changed, while DR stores the changed parameters (in DRS) plus any other parameters which may be involved in the consistency check. The data stored in IOTC, IOGC and the parameters in the disk file become DRS when read into the temporary database TEDB.

The changes to be introduced into the network may be entered into the temporary database TEDB in one of three possible ways: either via I/O tables in windows on a monitor (box IOT), by writing directly new parameters where desired or via graphic I/O means such as a mouse pointing on a monitor to, for example, a geographical location where a new cell is desired, (box IOG), or from a disk file DF where sets of prestored parameters are kept for the case of malfunction of, for example, a single base station. The portions of IOT and IOG labelled, respectively, IOTC and IOGC, store the desired changes. That is, the I/O program stores, and shows in a window on the monitor, the changes to be made, until change editing is to be started. Then a command is given to enter the changes into the temporary database TEDB. The changes are filed in the temporary database TEDB, but they are also stored by themselves in the blocks IOT and IOG as a log of what has been done. The operator may choose to enter the parameter changes himself, or they may be introduced from a disk file in the administrative center computer depending on the nature of the modification.

Figure 2:
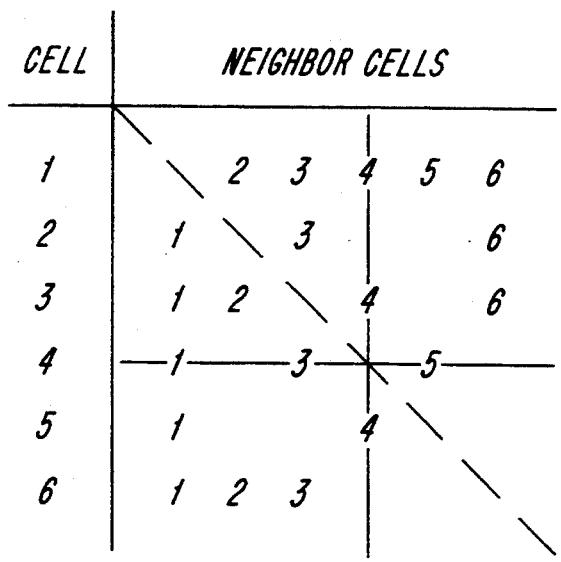
FIG. 2 illustrates an example of a manual check which is performed in conventional methods of implementing a reconfiguration.

The function block CONSISTENCY CHECK is a program which performs the verification tests on the entered suggested changes. A manual example of one such test has been described with respect to FIG. 2. This block will be described more fully below.

The function block TRANSLATOR is used when the suggested changes have been checked and found satisfactory. In a preferred embodiment, this program translates the parameters in the TEDB into man machine language (MML) commands. Alternatively, the TRANSLATOR program may translate the parameters into a corresponding AXE file format in a known manner. The translated information is then sent to MSC1 and MSC2.

Figure 4A:
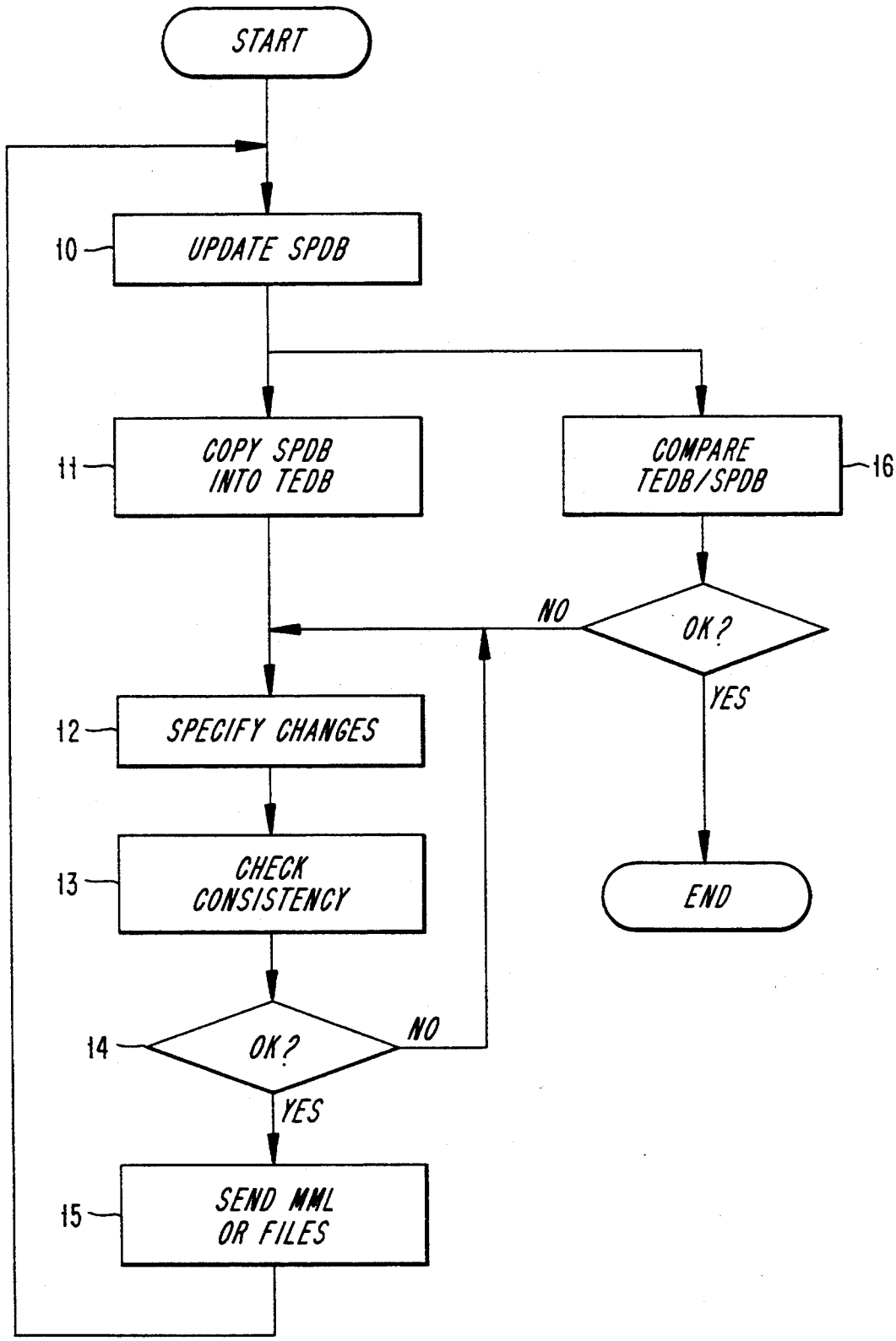

A preferred embodiment of the flow of control for the reconfiguring method according to the present invention is shown in FIG. 4. The coding of the process steps of the flow chart in FIG. 4 into the instructions of a suitable commercially available computer is a mere mechanical step for a routineer skilled in the art.

The updating of SPDB (step 10) may be started as a periodic function or may be event driven. If it is event driven, any occurrence in any mobile switching center which is known to alter the configuration of the network causes a message from the mobile switching center to the administrative center. This message informs the administrative center that an update should be initiated. Then, the administrative center sends an audit command to the mobile switching center involved, and will receive the modified data into the MSCDA. The differences between SPDB and MSCDA will be spotted by the function blocks DIFFLIST1, DIFFLIST2, DIFFLIST3 and the updating of SPDB will be performed by the function block UPDATE SPDB.

The SPDB is copied into the TEDB (step 11) and the changes are specified (step 12). The changes may be entered manually, by entering or changing figures in tables, or by pointing at the monitor using, for example, a mouse and specifying attributes, such as cell size and channel frequencies, as described above. Alternatively, the changes may be entered automatically, by letting an alarm signal, indicating that a particular base station or mobile switching center is out of service, cause a predefined set of changes to be entered from the disk file DF. A message indicating that the particular base station or mobile switching center has been repaired and is ready to be put into service again may be treated in the same way.

Block 13 causes a consistency check to be performed on the entered changes. If no inconsistencies are found (step 14), the flow continues to implement the changes in the network. If there are inconsistencies, an operator will decide whether to approve the changes anyway or to specify modifications to the changes (not explicitly shown).

In block 15, the approved changes are translated into orders for the mobile switching centers concerned, either in the form of man machine language MML commands or in the form of the AXE file format, and they are sent to the MSCs. This function is shown in more detail in FIG. 4B.

When the changes have been introduced into the network, the administrative center may perform an update of the SPDB and then compare the TEDB against the SPDB (block 16). These two databases should be the same at this point. If they are not, the cause can be analyzed and new changes can be specified to correct the error. The SPDB and TEDB may be compared in any manner known for comparing two databases. In order to save computer time, the comparison may be limited to the database areas which have been affected, for example, the DR in the TEDB and the corresponding area in the SPDB, and the data in the SPDB and the TEDB corresponding to data collected in the MSCDA.

In step 20, the changes in the TEBD are copied to the affected MSC's. However, before the verified and/or corrected cell parameters are activated in the network, the ongoing and new calls must be properly handled in a manner consistent with the network changes. Accordingly, before the new changes are activated in some cases, ongoing calls between affected cells may have to be handed off, in a known manner, to neighboring cells (step 21). For example, this would be the case when a temporary cell has been created because of a football game or other temporary, high traffic event and afterwards, the temporary cell has to be eliminated from the network. Before eliminating the cell, any new calls within this cell are inhibited (step 22) and directed retry can be used to redirect these calls to neighboring cells.

In the event that a complete MSC is to be added or deleted according to the present invention, it is necessary to inform the network, enabling it to route calls to the new MSC or to discontinue routing calls to a blocked (or deleted) MSC. This implies defining or deleting a destination in routing table in the switches of the wire-bound and mobile networks (step 23).

After the modifications have been made, the updated parameters are activated within the network (step 24). The calls in the affected cells are restarted (step 25) and the operator may then choose to optimize the newly changed parameters (step 26). Once the network is operating again, live traffic measurements may be taken which may be used to optimize the cell parameters and if necessary, further changes may be implemented responsive to the optimization.

An example of the optimization of parameters is as follows. A supervision program may detect that the congestion rate of a certain cell is much higher than in neighboring cells. A manual or automatic adjustment of the size of this cell and its neighbors may then take place by ordering a change of the minimum signal strength SSMIN required to allow handoff into a cell (refer to parameters listed in Table II). An increase in the threshold SSMIN of a cell may result in a smaller cell and vice versa.

Figure 5:
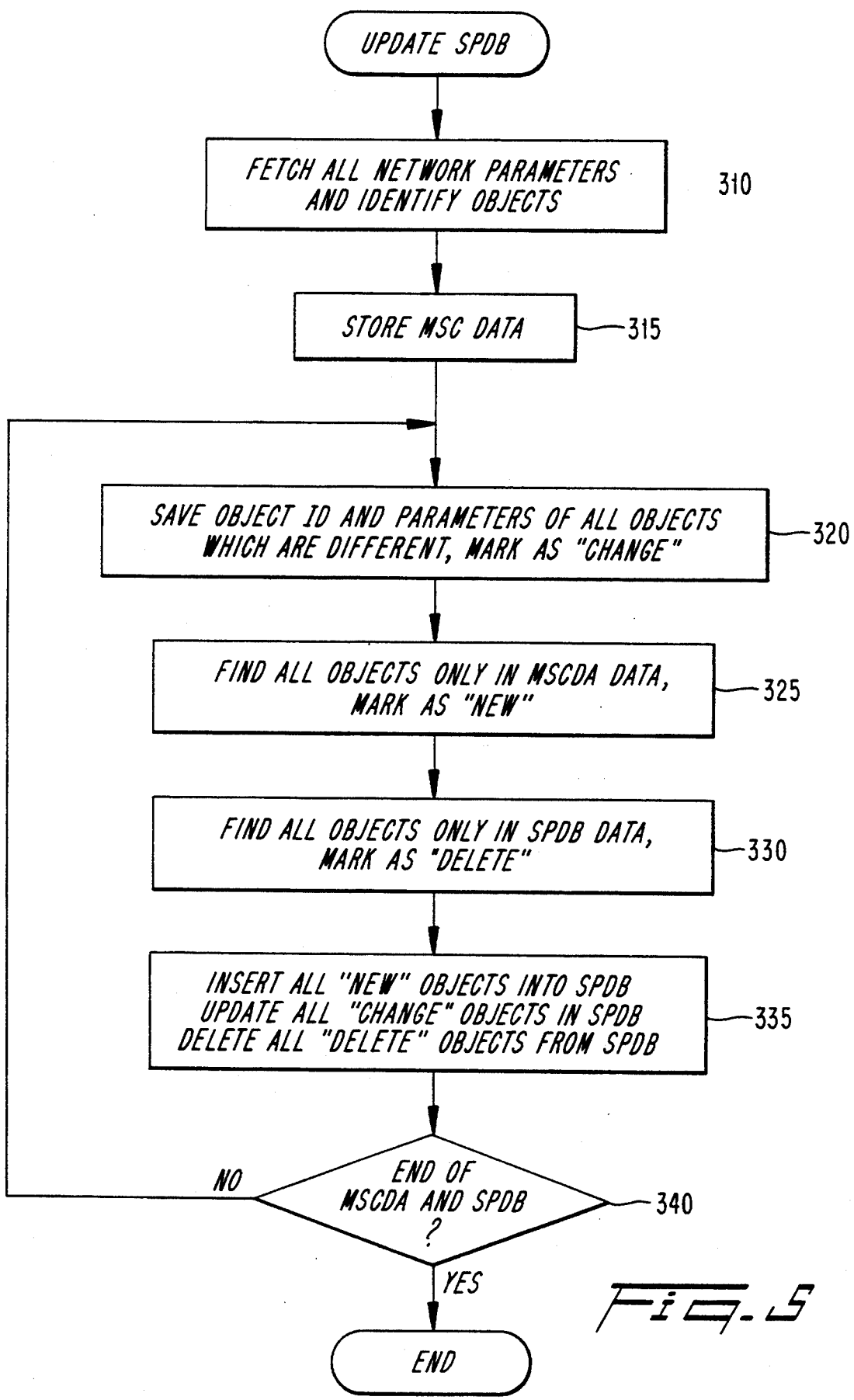
FIG. 5 is a flowchart illustrating an update routine according to the present invention.

The details of a preferred embodiment of the function block UPDATE SPDB will now be described with reference to FIG. 5. The coding of the process steps of the flowchart in FIG. 5 into the instructions of a suitable commercially available computer is a mere mechanical step for a routineer skilled in the art. As noted above, a copy of the parameter setup for the cellular network system is maintained in the system parameter database SPDB. All objects, that is, cells, base stations, etc., for which data is kept in the mobile switching centers, have a unique identity in the SPDB database. Loading of the database from the mobile switching centers is done as discussed above with reference to FIG. 3. The data in the SPDB is called, for purposes of this discussion, SPDB data.

According to a preferred embodiment of the invention, the update of the SPDB is done for each mobile switching center in the following manner. A complete update of the SPDB is shown and described. It is understood that partial updates of the SPDB may be performed in a similar manner within the scope of the present invention.

In step 310, all cellular network parameters are fetched from the mobile switching center and the different objects to be handled are identified. This data is called "MSC data" for purposes of this discussion. The MSC data is then stored in MSCDA (step 315). According to a preferred embodiment, the MSC data in MSCDA is organized in the same manner as the SPDB data. By organizing the two sets of data in a similar manner, the steps required to compare the data are significantly simplified.

The MSCDA data and the SPDB data are compared (steps 320–330) and one difference list is produced. As shown, the comparison process is divided into three steps. The parameters for all objects common to both the MSCDA data and the SPDB data are checked (step 320). This corresponds to DIFFLIST1 of FIG. 3. If one or several parameter values differ for an object, the object identity and its parameters are saved in the difference list. Parameters from both the MSCDA data and the SPDB data are saved so that a result list showing all changes of data in the SPDB can be produced after the update has been completed (for example, the printed output of UPDATE SPDB, FIG. 3). The common objects for which changes are required are marked with "change" in the difference list.

In step 325, which corresponds to DIFFLIST2 of FIG. 3, all objects are found which exist only in the MSCDA data. These objects are saved, with their parameters, in the difference list, with a "new" mark. Finally, all objects are found which exist only in the SPDB data (step 330). This corresponds to DIFFLIST3. These objects found only in the SPDB data are saved with their parameters in the difference list and are marked with "delete".

All changes now stored in the difference list are introduced into the SPDB database. In three steps, shown in step 335 of FIG. 5. All objects in the difference list marked "new" are inserted in the SPDB database. All objects in the difference list marked "change" are updated in the SPDB database with the new parameters from the MSCDA data. Finally, all objects in the difference list marked "delete" are deleted from the SPDB database.

At step 340, it is determined whether or not the end of both the MSCDA and the SPDB has been reached. If not, the routine returns to step 320. If so, the routine ends.

The CONSISTENCY CHECK routine will now be described with respect to FIG. 6. The coding of the process steps of the flowchart in FIG. 6 into the instructions of a suitable commercially available computer is a mere mechanical step for a routineer skilled in the art. The CONSISTENCY CHECK program uses the data kept in the TEDB to perform the checks. This routine is performed after the TEDB has been updated from the SPDB and suggested changes have been entered into DRS, as is clear from FIG. 4.

The CONSISTENCY CHECK routine performs the following groups of checks in the network. Additional checks are possible, according to the requirements of the specific network. Step 350 selects the cells to be examined and the tests or rules to be performed. Step 355 checks the frequency allocations for the control and voice channels. Step 360 is a hardware configuration check that determines that the cells have backup channel devices for the control channel and the signal strength receiver. The power level relationship is tested in step 365 to determine that the cells' power level parameters follow a number of known rules. For example, one such rule is that the base station power level must correspond to the size of the cell according to a known table. Step 370 checks the hand-off and locating thresholds to determine that they follow a number of known rules. One such rule is that the thresholds of neighboring cells must be such so as to avoid handoff oscillation back and forth between two cells. The intra-exchange hand-off relationships are checked in step 375 by checking that the relationship between the neighboring cell and adjacent cell lists are correct. For example, it must be possible to handoff back to the considered cell after an unsatisfactory directed retry. That is, an "adjacent" cell (defined for directed retry) must have the considered cell as a "neighbor" cell (defined for handoff). Step 380 checks the inter-exchange hand-off relationships by checking that the relationship between the neighboring cell and bordering cell lists are correct. For example, an "adjacent" cell (defined for directed retry) must have the considered cell as a "border" cell (defined for handoff), where a "border" cell is a neighbor cell connected to another MSC.

In step 385, two lists are output from the CONSISTENCY CHECK routine. The first list is of system parameters that are incorrect in some way and will degrade the system. The second list contains parameters that are missing in the SPDB (that is, there is no entry in the SPDB for each of the parameters), and therefore no checks were performed for those parameters. In addition to the lists, the inconsistencies in the parameters may be displayed graphically.

One execution of the CONSISTENCY CHECK routine includes the following actions. First the operator of the administrative center chooses which cells and which check-rules to execute and the CHECK routine is started. The CONSISTENCY CHECK routine goes through the chosen rules in sequential order. The routine then loops through the chosen cells and performs the sub-checks for each cell individually. If an inconsistency is detected in the data, this inconsistency is saved in the check result lists. When the execution is completed, the operator will be informed about the status, that is Execution Completed or Failed. The operator can specify limit values for the checked parameters. Additionally, thresholds can be set for each check rule which must be surpassed before an inconsistency will be found for that rule.

Figure 7A:
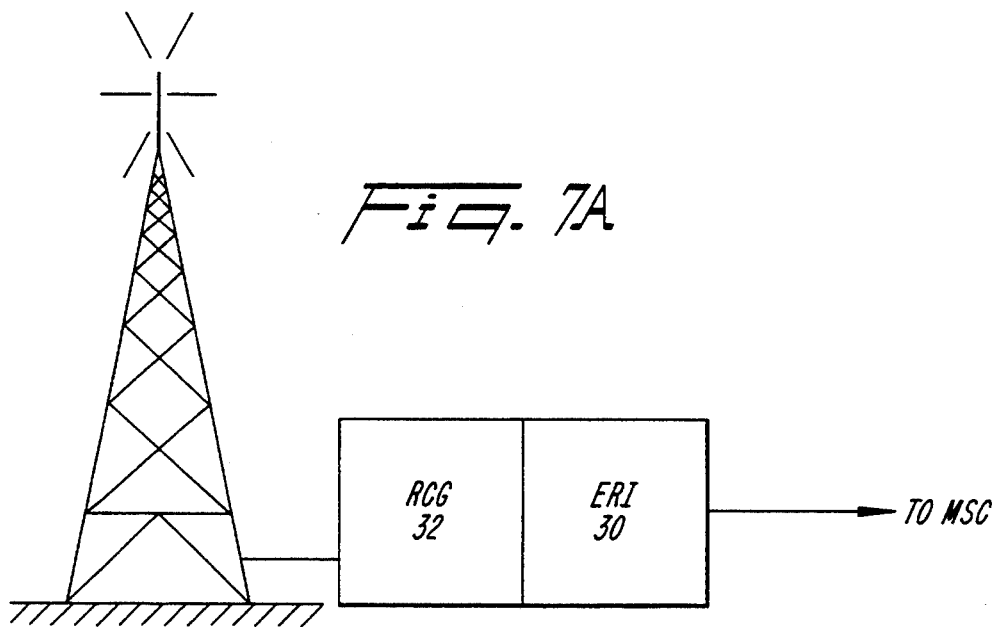

FIGS. 7A and 7B illustrate an embodiment of a base station that can be utilized in a cellular telephone system that operates in accordance with the present invention. The base station is designed for transmission and reception on a plurality of radio channels in this example analog communication channels and control channels. The equipment configuration shown in FIG. 7B, i.e., one control channel, a number of voice channels, one signal strength receiver, and one channel tester is a typical configuration of a radio channel group required to serve one cell. A typical base station shown in FIG. 7A comprises three major functional units: a radio channel group 32, exchange radio interface 30, and the power supply (not shown). The exchange radio interface 30 functions as a medium to signal between the mobile switching center and the base station. Thus, the equipment receives data from the channel units and sends this data to the mobile switching center on a dedicated mobile switching center to base station data link. In the reverse direction, the equipment receives data from the mobile switching center on the mobile switching center to base station data link and sends this data to the channel unit of destination. A voltage of 26.4 volts is normally provided as the distributed supply voltage to the base station from mains via analog AC/DC converters. A battery back-up power supply is normally provided for continued service in the case of mains break down.

The radio channel group 32 holds all of the equipment normally needed to handle the radio communication with the mobile stations. A typical radio channel group 32, shown in FIG. 7B, comprises the following equipment: channel units 42, 44, a transmitter/combiner 46, receiver multi-couplers 48, a signal strength receiver 50, a control channel redundancy switch 52, a channel tester 54, a power monitoring unit 56 and an antenna system 58.

The channel units for the control channels 42 and for the voice channels 44 are identical. Each channel unit consists of a transmitter 440, a receiver 442 and a control unit 444 and a power amplifier (not shown) connected to the transmitter output. The output power determines the size of the coverage area of the channel in question. The particular power amplifier used is controlled in order to obtain the required coverage for each cell. In addition, accurate adjustment of the output power may be manually performed.

A radio channel group can consist of a number of channel units, for example, 96 channel units. A radio base station can consist of one or more radio channel groups.

In typical configurations, the receiver multi-couplers 48 allow a number of channel receivers and signal strength receivers to be connected to the same receiver antenna. For example, up to 48 channel receivers and two signal strength receivers may be connected to the same receiver antenna.

The signal strength receiver 50 is implemented in a channel unit frame. It consists of a receiver 442 and a control unit 444. The signal strength receiver 50 measures the strength of the received signals (from the mobile stations) on any channel allocated for mobiles in the neighboring cells. The relevant channel numbers as specified by the mobile switching center and the channels are continuously scanned one-by-one and samples of the measurements are stored in the control unit 444.

The transmitter combiner 46 allows a number of transmitters to be connected to a common antenna, for example, up to 16 transmitters can be connected to one antenna. The channel tester 54 performs mobile switching center operator controlled tests of the equipment. The power monitoring unit 56 is connected at the combiner output. It supervises the forward and reflected power and activates an alarm when, for example, the reflected power is too high. The antenna system comprises several alternative antenna configurations depending on the cell shapes required.

The control unit 444 used in the various channel units is based on a microprocessor. The microprocessor can be any suitable commercially available microprocessor and may include program stores implemented with the read/write memories.

Figure 8:
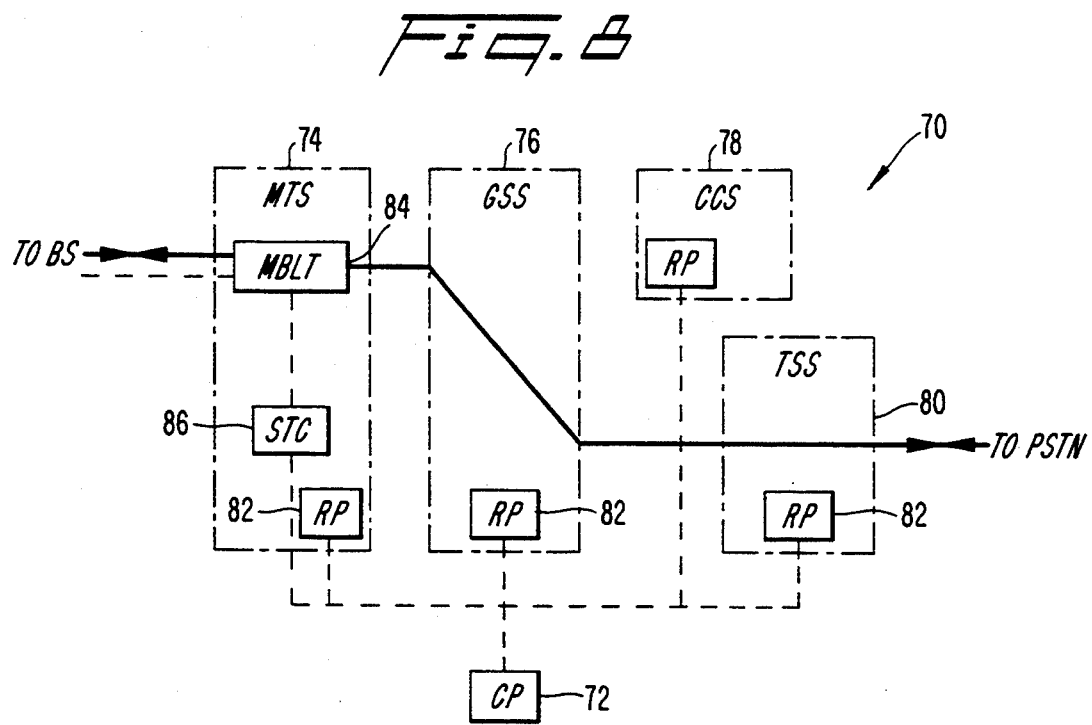
FIG. 8 is a block diagram illustrating a mobile switching center in a cellular mobile radio system.

FIG. 8 is a block diagram of an example of a mobile switching center which can be used to implement the method according to the present invention. The mobile switching center shown in FIG. 8 is a simplified block diagram of some of the functional units in a mobile switching center. FIG. 8 shows but one example of a mobile switching center. Other systems may also be used.

The mobile switching center 70 is a highly modular system which includes a central processor 72 and a mobile telephone subsystem 74 for the cellular system which is integrated with the other subsystems. A group switching subsystem 76, a common channel signalling subsystem 78, and a trunk and signalling subsystem 80 are connected to the central processor 72. The mobile telephone subsystem 74 includes a regional processor 82, a mobile telephone base station line terminal 84 and a signalling terminal 86. The remaining subsystems also each include a regional processor 82.

The mobile telephone subsystem 74 handles specific mobile subscriber functions, cellular network functions, as well as the signalling with the mobile stations. Subsystem 74 also provides the common channel signalling subsystem 78 with the necessary data from the mobile switching center signalling. The operation and maintenance functions specific for the cellular system are also implemented in the mobile telephone subsystem 74. The mobile telephone subsystem 74 includes the mobile telephone base station line terminals 84 which connect the mobile telephone subsystem 74 to the various base stations within the system and to the public switching telephone network. The signalling terminal 86 provided in the mobile telephone subsystem 74 handles data communication between the mobile switching center and the base stations. The regional processor 82 provided in each of the subsystems stores and executes the regional software for the switching system, handling simple, routine and high capacity tasks.

The group switching subsystem 76 is controlled by a traffic control subsystem (not shown). The group switching subsystem 76 sets up, supervises and clears connections through the group switch (not shown). The common channel signalling subsystem 78 contains functions for signalling, routing, supervision and correction of messages sent in accordance with a predetermined standard. The trunk and signalling subsystem 80 supervises the state of the trunk lines to the public switching telephone network and to the other mobile switching centers.

The central processor 72 stores and executes the central processor software for the switching system, handling the more complex functions. These functions include, but are not limited to, job administration, store handling, loading and changing of programs, etc. Further, to the extent that the methods according to the preferred embodiments of the present invention are implemented by software routines operating in the mobile switching center, they are implemented in the central processor 72.

It is understood that the methods of the present invention can be used in a cellular mobile radio system which transmits analog signals, digital signals, or a combination of both.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology of terminology employed herein is for the purpose of description and not of limitation.

TABLE I

| ORDER | EXPLANATION |
|---|---|
| MTCEI ... | Cell definition, cell 6 |
| MTCEC ... | Cell parameters, cell 6, except handoff parameters |
| MTNCC ... | ⎧ Neighbor cell definitions |
| MTDCC ... | ⎩ Directed retry cell definitions |
| MTNCC ... | ⎧ New cell 6 as neighbor to old cells |
| MTDCC ... | ⎨ New cell 6 as directed retry cell to old cells |
| BLODE ... | Deblock channels & signal strength receiver on new cell 6 |

EXAMPLE:
BLODE = MCC-XXX&MLOC-XXX&MVC-XXX&&-YY

| control channel | signal strength receiver | voice channel X to Y |

TABLE II

SITE DATA
    id        Site identification
If the geographical position is given:
    long     Geographical position, longitude
    lat      Geographical position, latitude
If the site id is not a common part of the site's cell id:s:
    cell1     Id of cell 1
    .
    .

TABLE II-continued

| | | |
|---|---|---|
| celln | Id of cell n (Max: 64, typically 3) | |

CELL DATA

Commands: MTCEI, MTCEE, MTCEC, MTCEP
MTCEP printout: Mobile Telephone Cell Data

Parameters:

| | |
|---|---|
| type | Cell type: omni or sectorized |
| deg | If sectorized cell: number of degrees |
| dir | Cell direction: 1 to 360° (90° = east, 180° = south, 270° = west, 360° = north) |
| size | Nominal cell size |
| cplan | Cell plan, 7/21 or 4/12 |

MTS parameters (examples only):

| | |
|---|---|
| r | Voice channel route |
| cell | Cell designation |
| sid | System identification number |
| plc | Mobile station power level for accessing the system on control channels |
| plvm | Maximum mobile station power level on voice channels |
| plv | Initial mobile station power level on voice channels |
| ssh | Signal strength threshold requiring handoff |
| ssb | Signal strength threshold requiring blocking of idle voice channel |
| ssmin | Minimum signal strength required to allow handoff into the cell; the actual signal strength is measured in the cell |
| snh | Signal to noise ratio requiring handoff |
| snr | Signal to noise ratio requiring release of the mobile station on a voice channel |
| suh | Time interval in seconds during which suppression of renewed handoff requests should take place |
| ssacc | minimum signal strength required on control channel for acceptance of originating accesses and page responses |
| ssreg | Minimum signal strength required on control channel for acceptance of registration accesses |

NEIGHBORING CELL DATA

Commands: MTNCI, MTNCE, MTNCP, MTNCC
MTNCP printouts: Mobile Telephone Neighboring Cell Data MTS parameters:

| | |
|---|---|
| cell | Cell designation |
| ncell | Neighboring cell designation |
| sshyp | Signal strength hysteresis value, required for handoff, positive value |
| sshyn | Signal strength hysteresis value, required for handoff, negative value |

CHANNEL DEVICE DATA

Commands: MTCCI, MTCCE, MTCDC, MTCDP
MTCDP printout: Mobile Telephone Channel Device Data MTS parameters:

| | |
|---|---|
| type | Channel device type: voice channel, control channel or signal strength receiver |
| dev1 | Channel device |
| cell | Cell designation |
| chnr | Channel number (f) |
| col | Color code (SAT or DCC) |
| dev2 | voice line |
| adm1 | Administrative state 1<br>C = Connected device<br>NC = Not connected device |
| adm2 | Administrative state 2<br>NHW = The device is not equipped with own hardware<br>BHW = The device is specified as back-up hardware for a control channel or a signal strength receiver |

What is claimed is:

1. A method of performing reconfiguration of a cellular network comprising a plurality of mobile switching centers, the method comprising:

copying existing cell parameters of selected mobile switching centers in the network to a database, and storing the copied parameters;

preparing a set of proposed changes to the stored parameters;

verifying, via a computer program, the consistency of the prepared set of proposed changes and making any necessary alterations of the set of proposed changes responsive to the verification;

copying, via a data link, the verified set of proposed changes to the selected mobile switching centers; and introducing the verified set of proposed changes into the plurality of mobile switching centers in the network to reconfigure the cellular network according to the verified set of proposed changes.

2. The method of claim 1, wherein the reconfiguration is temporary and further comprising the step of restoring the network to an original state using the stored cell parameters.

3. The method of claim 1, wherein the copying of cell parameters is initiated periodically by the operator and the set of proposed changes is manually entered.

4. The method of claim 1, wherein the reconfiguration is automatically initiated upon an occurrence of an event and the set of proposed changes is stored in a memory.

5. A method of modifying at least a part of a cellular network, the network comprising an administrative database, at least one switch, and a plurality of cells, the method comprising the steps of:

copying, via a datalink from associated ones of the switches to the administrative database, cell parameters of at least one cell as the parameters are stored before a proposed modification is implemented;

determining at least one change to the cell parameters of the at least one cell affected by the proposed modification;

entering the at least one change into the administrative database;

verifying, via a computer program, the consistency of the entered change;

making any necessary corrections to the at least one change responsive to the verification;

copying the verified/corrected cell parameters to the associated ones of the switches from the administrative database via the data link; and activating the verified/corrected cell parameters in the associated ones of the switches to introduce the modification into the network.

6. The method of claim 5, wherein the network further includes at least one mobile station and the method further comprises prior to the step of activating, the steps of:

eliminating ongoing calls of the at least one mobile station assigned to the associated cells by handing off ongoing calls to neighboring cells;

inhibiting new calls in the affected cells by using directed retry; and further comprising, after the step of activating, the step of restarting calls in the affected cells.

7. The method of claim 5, further comprising:

storing a set of parameter changes for at least one base station in the network; and when a particular base station malfunctions, automatically initiating the modification of the at least part of the cellular network by using the stored set of parameter changes associated with the particular base station in the step of determining.

8. The method of claim 5, further comprising:

storing a set of parameter changes for at least one mobile switching center in the network; and when a particular mobile switching center malfunctions, automatically initiating the modification of the at least part of the cellular network by using the stored set of parameter changes associated with the particular mobile switching center in the step of determining.

9. The method of claim 5, further comprising:
before the step of activating, ordering routing table changes in any mobile switching centers affected by the modification.

10. The method of claim 5, further comprising:
measuring live traffic in the network after the step of activating; and
optimizing the cell parameters using successive changes responsive to the live traffic measurements.

11. A method of maintaining a system parameter database in a cellular network, comprising:
obtaining, via a data link, current parameter data from at least one mobile switching center in the network;
storing the obtained current parameter data in a data buffer;
generating, via a computer program, a difference list by comparing the stored current parameters with existing data in the system parameter database and storing, in the difference list data which is in the stored current parameter data but not in the existing data, data which is in the existing data but not in the stored current parameter data, and data which has different values in the stored current parameter data as compared with the existing data; and
updating the system parameter database from the difference list.

12. The method of claim 11, wherein the step of updating comprises:
deleting data from the system parameter database which is in the existing data but not the stored current parameter data;
adding data into the system parameter database which is in the stored current parameter data but not in the existing data; and
updating data in the system parameter database for which different values were found.

13. The method of claim 11, wherein the maintenance of the system parameter database is performed on a periodic basis.

14. The method of claim 11, wherein the maintenance of the system parameter database is performed upon occurrence of a predetermined event.

15. An apparatus for providing temporary communication service to a predetermined area in a cellular radio system in response to a communication need at a predetermined time, comprising:
a base station located near the predetermined area in need of communication service; and
means connected to the system for copying a plurality of system changes, which are required to connect the base station to the system and which affect at least one mobile switching center, from a memory to the affected mobile switching centers in the network and for introducing the plurality of system changes into the system to provide service to the predetermined area at the predetermined time.

16. The apparatus of claim 15, wherein said means for implementing comprises means for verifying the consistency of the plurality of changes.

17. An apparatus for performing reconfiguration of a cellular network, said network including at least one cell connected to at least one mobile switching center, said apparatus comprising:
at least one mobile switching center database for storing a plurality of cell parameters;
a system parameter database connected to the at least one mobile switching center database for storing an up-to-date image of cell parameters in the network;
buffer memory means connected to the at least one mobile switching center database and the system parameter database for storing at least one cell parameter change to be used to update the system parameter database; and
a temporary database connected to the system parameter database for temporarily storing proposed cell parameter changes to be introduced into the network to reconfigure the cellular network.

18. The apparatus of claim 17, further comprising means for updating the system parameter database from the at least one cell parameter stored in the buffer memory means, said means being connected to the system parameter database and buffer memory means, and being responsive to an update command.

19. The apparatus of claim 18, wherein the means for updating comprises:
means for creating a difference list by comparing the at least one cell parameter in the buffer means with the cell parameters stored in the system parameter database, and storing in the difference list any cell parameter which is in the system parameter database and not in the buffer means, any cell parameter which is in the buffer memory means and not in the system parameter database, and any cell parameter for which the value in the buffer memory means is different than the value in the system parameter database.

20. A method of performing maintenance of parameters within a cellular network, the network comprising at least one switch, and a plurality of cells, the method comprising:
copying data from at least one switch affected by the maintenance into a buffer memory;
updating data in a system parameter database from the data in the buffer memory, the step of updating comprising maintaining an up-to-date image of the network in the system parameter database.

21. The method of claim 20, wherein the step of updating comprises:
generating a difference list by comparing the data in the system parameter database with the data in the buffer memory and storing in the difference list data, which is in the system parameter database and not in the buffer memory, data which is in buffer memory and not in the system parameter database, and data which has different values in the system parameter database as compared with the buffer memory; and
updating the system parameter database from the different list.

22. The method of claim 21, wherein the step of updating from the difference list comprises:
deleting data from the system parameter database which is in the system parameter database and not in the buffer memory;
adding data to the system parameter database which is in the buffer memory and not in the system parameter database; and
updating data in the system parameter database for which different values are found.

23. The method of claim 20, further comprising:

copying the data in the system parameter database into a temporary database;

making changes to the data stored in the temporary database;

performing at least one consistency verification procedure on the changed data stored in the temporary database; and transferring the verified data to the at least one switch affected by the maintenance.

24. The method of claim 23, wherein the step of performing comprises, for any data that fails the at least one consistency verification procedure, making any necessary correction to the data, and the step of transferring comprises when the data passes the at least one consistency verification procedure, translating the data to appropriate commands and sending the commands to the affected at least one switch.

25. The method of claim 23, further comprising measuring live traffic in the network after the step of transferring and optimizing cell parameters in the at least one switch responsive to the live traffic measurements.

* * * * *